Jan. 4, 1944.     T. L. MAY     2,338,125
AUTOMATIC PRESSURE OPERATED LATHE
Filed Aug. 27, 1940     6 Sheets-Sheet 1

INVENTOR
Thomas Leslie May
BY Kenyon & Kenyon
ATTORNEYS

Jan. 4, 1944. T. L. MAY 2,338,125
AUTOMATIC PRESSURE OPERATED LATHE
Filed Aug. 27, 1940 6 Sheets-Sheet 3

INVENTOR
Thomas Leslie May
BY Kenyon & Kenyon
ATTORNEYS

Jan. 4, 1944.  T. L. MAY  2,338,125
AUTOMATIC PRESSURE OPERATED LATHE
Filed Aug. 27, 1940  6 Sheets-Sheet 5

INVENTOR
Thomas Leslie May
BY Kenyon & Kenyon
ATTORNEYS

Patented Jan. 4, 1944

2,338,125

UNITED STATES PATENT OFFICE 2,338,125

AUTOMATIC PRESSURE OPERATED LATHE

Thomas Leslie May, Toronto, Ontario, Canada, assignor to Reliance Machine and Tool Company, New York, N. Y., a firm composed of the following members, Esther Protes and Thomas Leslie May Application August 27, 1940, Serial No. 354,369

7 Claims. (Cl. 82—14)

The present invention relates to lathes and more particularly to fluid pressure controlled lathes for use in the manufacture of shells for munitions purposes and the like.

It is an object of the present invention to provide a lathe suitable for use in the quantitative rapid production of shells for munitions purposes.

Another object of the present invention is the provision of a lathe having high power, accurate cutting qualities and high speed operation.

The lathe of this invention is capable of use for production of shells of all sizes and while adapted primarily to operate on shell blanks preliminary to the nosing operations, is also adaptable for use in shell finishing operations and for aeronautical tooling operations and other metal turning and cutting operations requiring high power, accuracy of cutting control and speed of operation.

It is another object of this invention to provide a lathe provided with a plurality of cutting tools operative both longitudinally and transversely of the turning axis of the lathe, whereby each cutting tool will operate only over a comparatively small zone of the work surface and whereby a multiplicity of turning and cutting operations may be performed simultaneously on the work blank. The provision of such plurality of tools reduces the tool carriage travel and consequently the necessary size of the lathe. It also increases speed of production by simultaneously cutting over a plurality of zones of the work blank. As a result, the blank may be quickly shaped and simultaneously cut off at its ends to predetermined length in a single sequence of lathe operations.

A further object of the invention is to provide fluid (gas or liquid) means for pressure feed of the cutting tools, both transversely and longitudinally of the turning axis of the lathe.

Still another object is to provide fluid (gas or liquid) pressure controlled means for operation both of the head and the tail stock of the lathe, such means serving to properly position and positively clamp a work blank between the two during cutting operations thereon and permitting quick release and removal of a finished blank.

A further object of this invention is to provide a system of control for the pressure supply to the various pressure actuated parts having a minimum number of controls, all conveniently located at a central control point in such manner that the machine operator may devote his attention chiefly to observation of the work blank and conveniently and quickly regulate the tool movements and other machine operations without detailed attention to searching for controls or moving about from point to point of the machine to reach them.

Another object of this invention is to provide pressure feeds for the cutting tools of such a nature that controlled feed and rapid return of the cutting tools to their starting positions is effected.

To the accomplishment of the foregoing and such other objects as may hereinafter appear, this invention consists in the construction and arrangement of parts hereinafter described and then sought to be defined in the appended claims, reference being had to the accompanying drawings forming a part hereof and which show, merely for the purposes of illustrative disclosure, a preferred embodiment of the invention, it being expressly understood, however, that various changes may be made in practice within the scope of the claims without digressing from the inventive idea.

In the accompanying drawings in which similar reference characters denote corresponding parts

The lathe in general comprises a lathe frame carrying at its head end a driven mandrel equipped with a suitable chuck or work clamp and at its opposite end having a tail stock adjustable longitudinally along the frame bed and equipped with a live reciprocally movable tail center or spindle. Tool carriages movable along the frame bed are provided both at the front and rear of the machine bed. Each tool carriage is provided with a plurality of tool carriers adapted for cross-feed, e. g., to move transversely of the frame bed and into and out of the work blank carried between the chuck and tail stock spindle. The chuck preferably is a fluid pressure actuated one. The tail center piece or spindle is adapted to be reciprocally moved toward and away from the work blank by fluid pressure controlled means. The tool carriers likewise are movable toward and away from the work blank by fluid pressure controlled means, and suitably coordinated fluid pressure systems of control are provided for imparting desired and required fluid pressure for operating the chuck, the movement of the tail center piece or spindle, the movement of the tool carriages, and the tool feeding movement of the tool carriers. Likewise means are provided in the pressure systems of the tool feeds to provide controlled cutting feeds and quick return of the tools after completion of the cutting operations on the lathe.

Figure 1:
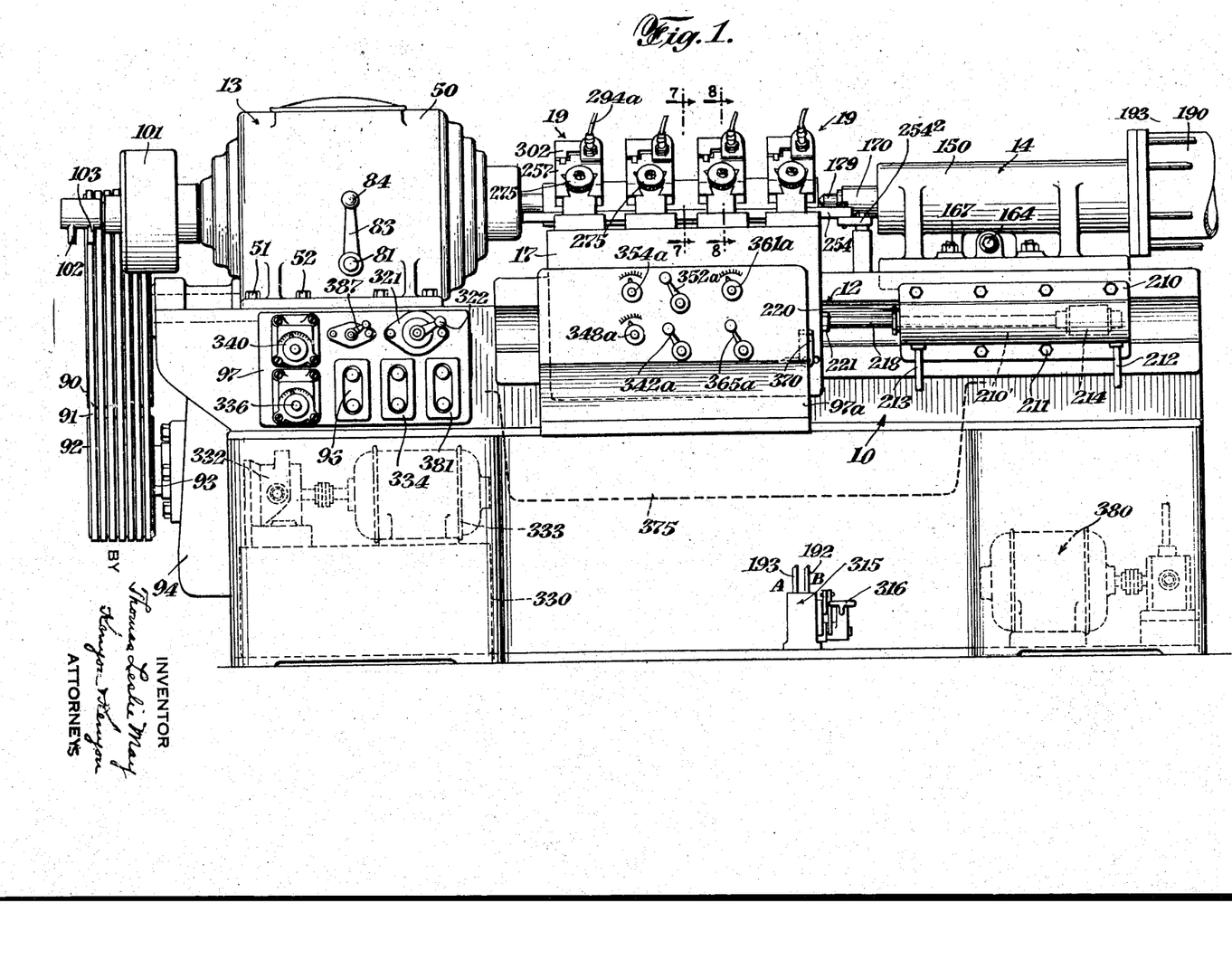
Fig. 1 is a front elevation of a lathe embodying my invention.
Figures 4, 5, 6:
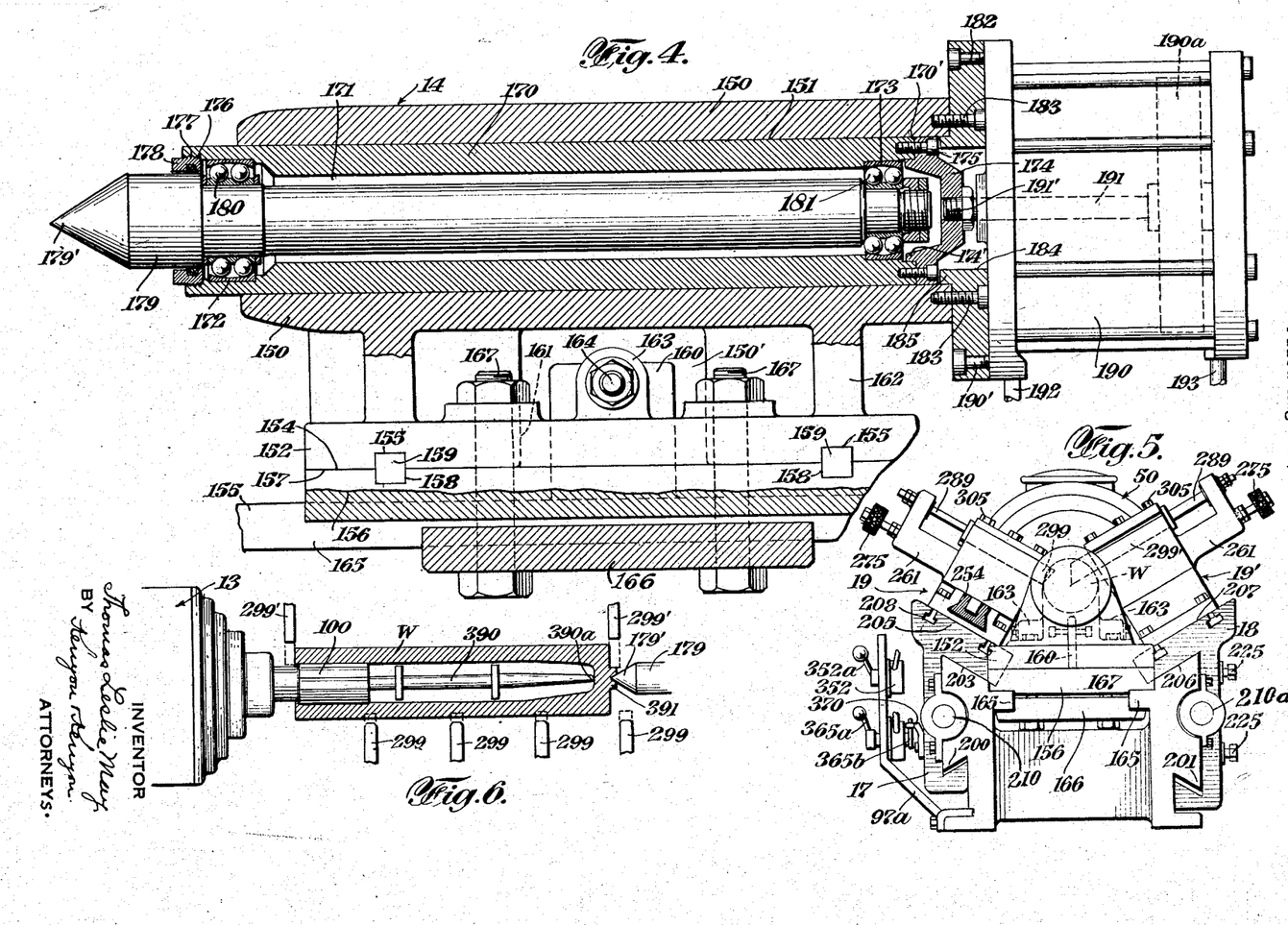
Fig. 4 is a vertical section on an enlarged scale taken along line 4—4 of Fig. 2 viewed in the direction of the arrows and illustrating the structure of the tail stock of the lathe.
Fig. 5 is a partial end elevation of the lathe viewed from the right of Fig. 1.
Fig. 6 is a partial sectional view illustrating the position of a shell blank in the lathe during the cutting operations thereon.

Referring more in detail to the drawings and particularly to Figs. 1 and 5, 10 denotes generally a lathe frame having a horizontal bed 12. A lathe head denoted generally at 13 is carried on the frame at one end of the bed and a tail stock 14 is carried on the bed at its opposite end. The front and rear sides of the frame adjacent the bed are provided with horizontal tool carriage rails on which are slidably mounted the respective tool carriages 17 and 18, each of which carries respectively a plurality of tool carriers 19 and 19' to be described more in detail hereinafter.

The work blank W (Fig. 6) is adapted to be supported between the head and tail stock and rotated in a manner to be presently described. Tools carried by the carriers 19 and 19' are adapted to be cross fed toward and away from the work blank and the carriers 19 on the forward carriage 17 are movable as a unit with the latter along the bed and in such movement are guided so as to cut the surface of the blank 10 to desired profile. Since the various operating parts of the lathe can best be described separately, each will now be so described and later coordinated in a general description of operation of the machine.

*The lathe head (Figs. 1, 2 and 3)*

Figure 3:
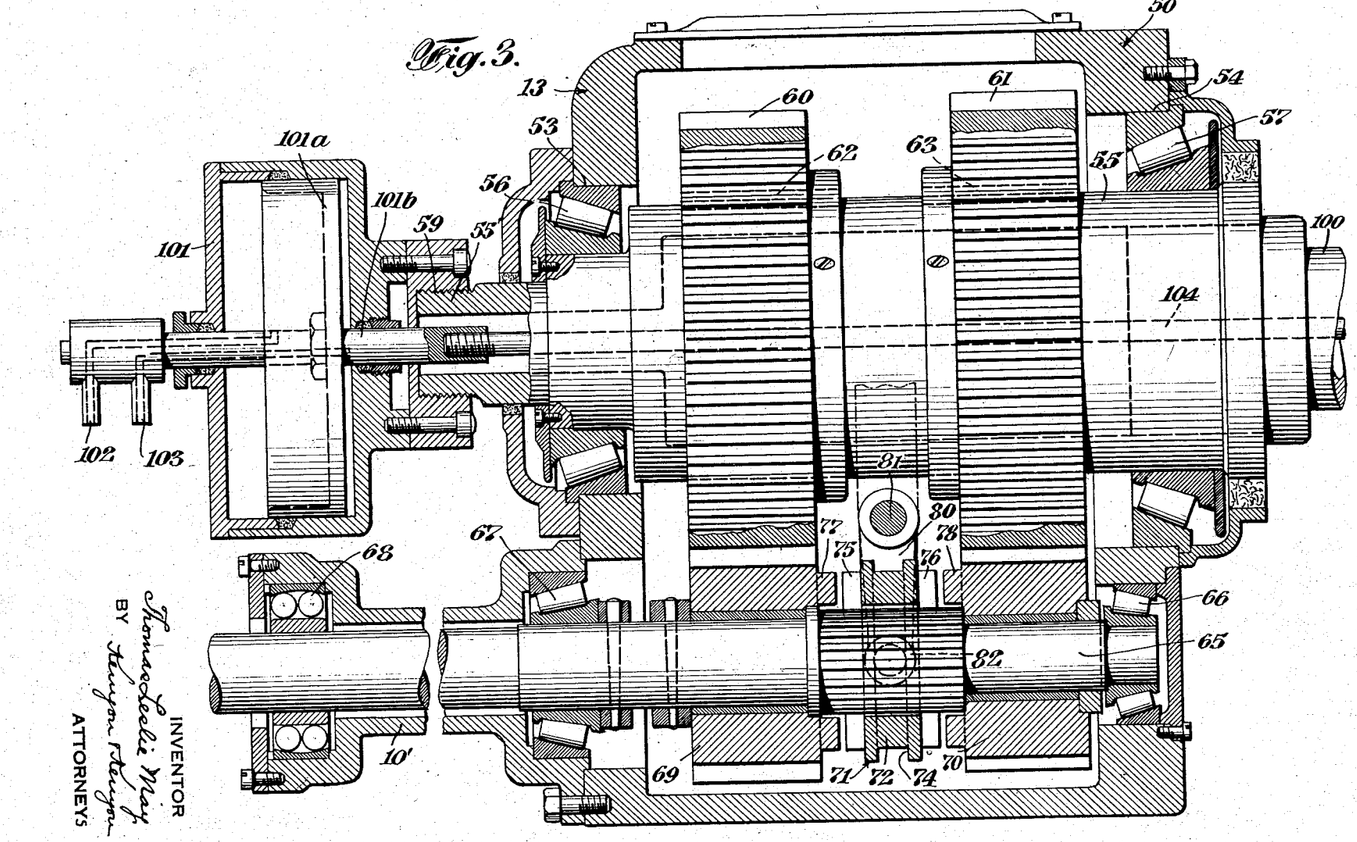
Fig. 3 is a vertical section on an enlarged scale taken along line 3—3 of Fig. 2 viewed in the direction of the arrows and illustrating the structure of the lathe head.

The lathe head 13 comprises a casing 50 which is suitably supported from the frame 10 as by bolting at 51 and 52 or the like. This casing has oppositely arranged end openings 53 and 54. A tubular driven mandrel 55 is rotatably supported on the roller bearings 56, 57 in the casing with its ends positioned in the respective openings 53 and 54. One end 55' of the mandrel extends outwardly through the opening 53 and is reduced in diameter and threaded at 59 to receive a rotating double acting fluid pressure cylinder to be presently described.

Driving gears 60 and 61 of suitable type are supported and keyed or otherwise fixed at 62 and 63 to the mandrel 55 in spaced relationship inside of the casing 50.

A drive shaft 65 is rotatably supported between the roller bearings 66, 67 in the casing 50 and by the roller bearing 68 in the tubular or sleeve bracket 10'. This drive shaft carries two spaced freely rotatable gears 69 and 70 meshing respectively with the mandrel driving gears 60 and 61. Either of the gears 69 or 70 may be coupled to the drive shaft 65 by a suitable instrumentality such as the dog clutch 71. The latter, in the embodiment shown, comprises a ring member 72 slidably keyed to or otherwise suitably attached on the shaft 65 in the space between the gears 69 and 70. This ring member is provided with oppositely extending engaging flanges or pins 75 and 76 on its lateral faces and with an annular groove or recess 74 on its peripheral face. The gears 69 and 70 have oppositely extending engaging pins or flanges 77 and 78 which may engage respectively with the pins or flanges 75 and 76 when the ring member 72 is moved in the axial direction of the shaft 65. The flanges or pins 75, 76, 77 and 78 are so admeasured that in the neutral or uncoupled position of the ring member 72 shown in Fig. 3, there is no inter-engagement between flanges on the gears and flanges on the ring. Movement of the ring member 72 toward the gear 69 will cause the flanges 75 to engage flanges 77 and to impart driving motion to the gears 69 and 60 and consequently to the mandrel 55 at a speed dependent upon the gear ratio of gears 69 and 60. Movement of the ring member 72 oppositely toward the gear 70 will cause the flanges 76 to engage flanges 78 and to impart driving motion from the shaft 65 to the gears 70 and 61 and consequently to the mandrel 55 at a speed dependent upon the gear ratio of the gears 70 and 61 which differs from that of the ratio of the gears 69 and 60. The required shifting of the ring member 72 may be effected in any suitable way. For example, a lever 80 suitably pivoted at 81 to the casing 50 is provided. This lever has an engaging pin or follower 82 at one arm end which extends into the annular groove 74 of the clutch ring 72 but permits free rotation of the latter. The opposite arm 83 of the lever extends outwardly from the casing 50 (Fig. 1) and has a manipulating knob 84 at its end. Rotation of the lever arm 83 clockwise or counterclockwise causes a relative shift of the ring member toward one of the gears 69 or 70 to effect coupling of the desired one of these gears to the drive shaft 65.

Figures 2, 6A:
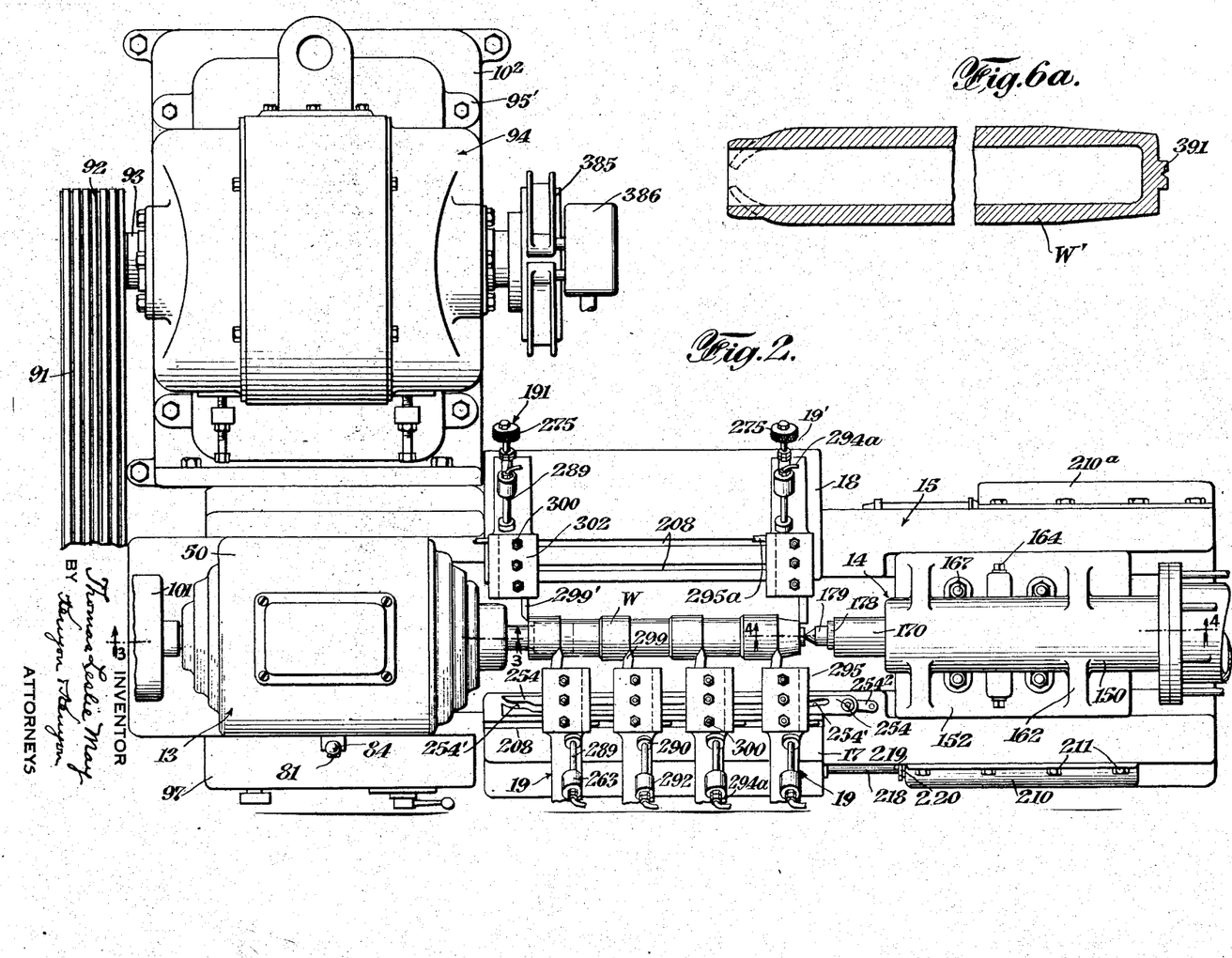
Fig. 2 is a top plan view of the lathe of Fig. 1.
Fig. 6a is a longitudinal section of a particular type of finished work blank cut to shape in the machine of this invention.

Suitable means for driving the shaft 65 are provided. To this end, in the embodiment shown, a multi-band pulley wheel 90 (Fig. 1) is carried on one end of the shaft 65. Multi-band belting 91 couples pulley wheel 90 with a corresponding pulley wheel 92 on the drive shaft 93 of a driving motor 94 (Fig. 2). The motor is suitably supported on a pedestal extension $10^2$ of the frame 10 as by bolting at 95'. Electric power is supplied to the motor in any convenient manner (not shown). A control switch 96 suitably carried on a control panel 97 (Fig. 1) located on the front of the frame 10 near the head serves for switching on and off of the power supply to the motor. The electrical connections between switch and motor being conventional are not shown. Other convenient means for driving the shaft 65 may be employed.

The driven mandrel 55 (Fig. 3) is provided with any standard form of chuck. In the embodiment shown this comprises an expandible chuck 100 of any standard type (Figs. 3 and 6) suitably carried in the mandrel and extending forwardly from the latter toward the tail stock of the machine. This chuck is adapted to be operated by gas or liquid pressure controlled means. To this end, a double acting rotating gas or liquid pressure cylinder 101 of a standard well-known type is carried on the threaded end 58 of the mandrel. This cylinder generally comprises a piston 101a rotatably borne in a sealed chamber and reciprocably movable longitudinally of the cylinder under gas or liquid pressure supplied to opposite sides of the piston from a suitable source through pipes 102, 103. The piston has a coupling member 101b extending therefrom which is coupled to the draw rod 104 which operates the chuck in well-known manner. The draw rod 104 as shown extends from the chuck 101 through the hollow mandrel 55. In operation, introduction of gas or liquid into the cylinder through one or the other of the pipes 102, 103 will cause longitudinal movement of the draw rod 104 and consequent expansion or contraction of the chuck 100. The control system for supplying fluid (gas or liquid) to operate the cylinder will be hereinafter described.

The tail stock (Figs. 1, 2 and 4)

It is desirable with a machine of the character described to provide a tail stock having a rotatable tail center piece or spindle capable of rapid movement toward the chuck to position and clamp a work blank W between them in such manner as to eliminate substantially all danger of off-centering of the work during the tooling operations. Since the tail stock is located at a point relatively remote from the operator's position, the usual screw operated tail stock center pieces are undesirable because the manual manipulation necessary with such stocks requires the operator to leave his control position. It is also desirable to provide a tail stock spindle which is conveniently movable to facilitate positioning of a work blank in the machine. In the tail stock of the present invention, therefore, I substitute a novel fluid pressure actuated tail stock center piece or spindle which may be conveniently foot-operated from a position of the operator at the front of the lathe.

In general, the tail stock of this invention comprises a center piece or spindle rotatably supported in the tail stock casing and reciprocably movable longitudinally by fluid (gas or liquid) pressure. The tail stock is itself adjustably positioned with respect to the lathe bed and may be moved as a unit along the bed to accommodate different lengths of work blanks.

In the embodiment shown, the tail stock 14 comprises a casing 150 (Fig. 4) having a horizontal bore 151. The casing has a horizontal base plate 152 supported in spaced relationship from the casing 150 and provided with a flat bottom surface 154. This surface is provided with two guide grooves 155 which extend transversely of the lathe bed and rests upon a base member 156 having a correspondingly shaped top surface 157. This base member is also provided with transverse grooves 158 carrying guide rails 159 which extend into the guide grooves 155 of the base plate so that the casing may be guidedly moved transversely of the lathe bed. An upstanding flange 160 extends from the base member 156 through an opening 161 in the base plate into a cut-away portion 150' in the supporting portion 162 of the casing 150, and between two oppositely arranged transversely extending threaded journals 163 each bearing an adjustment screw or bolt 164. The latter engage the flange on opposite faces thereof and serve for lateral or transverse adjustment of the casing 150 relative to the base member 156 for the purpose of effecting transverse adjustment of the tail stock center piece or spindle relative to the lathe bed. Other suitable transverse adjustment means may be used.

The base member 156 is slidably carried on a pair of horizontal guide rails 165 (Fig. 5) extending longitudinally of the lathe bed. A clamping plate 166 engaging below the guide rails 165 and secured to the base plate 152 and base member 156 by the locking bolts 167 serve to fix the casing 150 in any adjusted position along the guide rails 165 and relative to the base member 156.

A tail stock quill 170 is slidably borne in the bore 151 of the casing. This quill has a longitudinal bore 171 provided adjacent opposite ends with larger diametered bearing receiving portions 172 and 173. A yoke member 174 is suitably attached to the end face 170' of the quill by bolts 175 or the like. At the other end of the quill, the bore is further enlarged to define a shoulder 176 and internally threaded at 177 to receive a locking nut 178 which serves to retain the tail stock rotatable center piece or spindle 179 in the quill in a manner to be presently described.

The tail stock rotatable center piece or spindle 179 is rotatably supported in the quill 170 by the roller bearings 180 and 181 located in the respective enlarged portions 172 and 173 of the bore and is fixed against longitudinal movement with respect to the quill by the locking nut 178 and abutment 174' on the yoke 174 which engage the side faces respectively of the roller bearing assemblies and prevent longitudinal displacement of the tail center piece or spindle relative to the quill.

An end plate 182 is suitably attached to the casing 150 at 183. This plate has a central bore 184 and an annular flange 185 at the inner end of said bore extending into the bore 151 of the casing. This flange serves as an abutment to limit rearward travel of the quill by engagement with the yoke 174.

The quill is reciprocably movable in the bore 151 by fluid (gas or liquid) pressure controlled means. To this end, a double acting fluid pressure cylinder 190 of a standard well-known type is attached to the end plate 182 as at 190' with its connecting rod 191 attached to the yoke member 174. This cylinder generally comprises a piston 190a reciprocably movable in a sealed cylinder chamber under fluid (gas or liquid) pressure supplied to opposite sides of the piston from a suitable source through pipes 192 and 193. The piston has the coupling or connecting rod 191 extending therefrom which is attached to the yoke member 174 at 191' so that the pressure-controlled movement of the piston is transmitted through this rod to said yoke member and consequently to the quill which is thus movable longitudinally in the bore 151 under action of the cylinder 190. This pressure-controlled movement of the quill serves to move the centering head 179' of the live center piece or spindle 179 toward and away from the head and into and out of engagement with the work blank W in a manner to be presently described. The control system for supplying fluid pressure to operate the cylinder 190 will be hereinafter described.

*Tool carriages (Figs 1, 5 and 7-9)*

The lathe has the tool carriages 17 and 18 operating at the front and rear of the lathe bed respectively, each of which is adapted to move along the said bed between the head and tail stock of the machine.

To this end, the carriage rails 200, 201, each having dovetailed section (Fig. 5) or other suitable section, are suitably supported horizontally from the front and rear of the frame 10 adjacent to the lathe bed. On the forward rail 200, the tool carriage 17 having a dove-tailed or other suitably shaped groove 203 to receive the rail 200, is slidably mounted. This carriage has an inclined upper table surface 205 on which front tool carriers 19 to be presently described are mounted. A similar tool carriage 18 having a dovetailed or other suitably shaped groove 206 to receive the rail 201 is slidably mounted on the said rail 201. This carriage 18 likewise has an upper table surface 207 inclined in opposite direction to that of surface 205 and the two surfaces slant inwardly and downwardly toward the lathe bed. Each surface (205, 207) has a pair of spaced parallel locking grooves 208 having T-section or other suitable section for a purpose to be presently described. These grooves 208 extend in a direction parallel to the lathe bed.

Means are provided for imparting reciprocal motion to the front tool carriage 17 by the use of fluid (liquid or gas) pressure. In the embodiment shown, the means comprises a double acting pressure cylinder 210 (Figs. 1 and 5) suitably attached as by bolting at 211 to the carriage rail 200. This cylinder has a horizontally extending pressure chamber 210' having inlet conduits or pipes 212 and 213 (Fig. 11) at opposite ends. A suitable piston 214 is slidably movable in the pressure chamber 210' and reciprocated longitudinally thereof under fluid pressure supplied to the chamber through the ports 212 or 213 from the pipes 216 and 217 respectively in a manner to be presently described. A piston rod 218 (Fig. 1) is attached to the piston 214 and extends outwardly from the chamber at 219, a suitable packing gland arrangement 220 being provided to prevent escape of pressure fluid (gas or liquid) from the chamber 210 during operation. The piston rod is suitably coupled to the tool carriage at 221 so that reciprocal motion imparted to the piston 214 and piston rod 218 by pressure actuation of the piston is correspondingly imparted to the carriage causing it to travel on the rail 200 along the carriage bed. Cylinder chamber 210' has sufficient length to provide the necessary stroke or extent of tool carriage travel over the rail 200 to carry out the front tool-cutting operations to be presently described.

The rear carriage 18 may be similarly reciprocated along the rail 201, by the use of a similar pressure cylinder 210ª (Fig. 2) but in the embodiment shown this carriage is adapted to remain in a predetermined fixed position on the carriage bed inasmuch as the tool carriers 19' thereon are not required to be moved in the longitudinal direction of the work blank. This rear carriage, therefore, while also capable of adjustment along the rail 201, is provided with suitable positioning means such as set screws or bolts 225 (Fig. 5) serving to fix it in an adjusted position on the carriage rail 201. The forward carriage 17 may be similarly equipped, if desired.

*Tool carriers (Figs. 7-10, inclusive)*

The front and rear tool carriages 17 and 18 are each adapted to support a plurality of tool carriers 19 and 19', respectively, each of which must be capable of cross feed, i. e., capable of moving transversely of the carriage travel path and into the work blank W. In the embodiment shown, four tool carriers 19 are supported on the front tool carriage and two tool carriers 19' are supported on the rear carriage. The number of such carriers on each carriage is optional and fewer or more tool carriers may be supported on each carriage. Each tool carrier has identical construction and one only will be described.

Figures 7, 8, 9, 10:
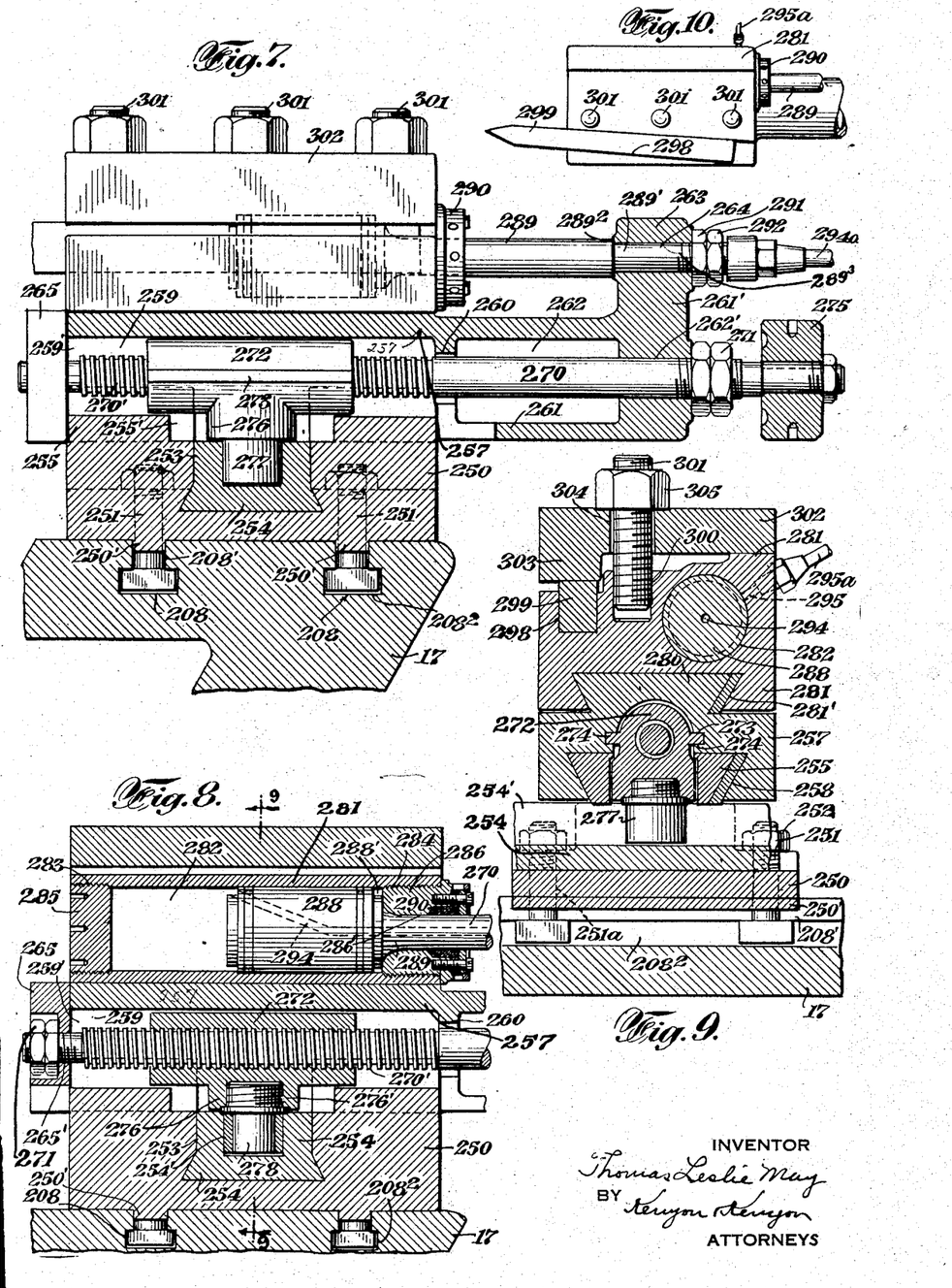
Fig. 7 is an enlarged partial vertical section taken along line 7—7 of Fig. 1 and illustrating in detail the tool carriage-carrier assembly.
Fig. 8 is a view similar to that of Fig. 7 illustrating further details including the pressure cylinder for tool cross-feeding in the tool carrier assembly.
Fig. 9 is a transverse vertical section taken along line 9—9 of Fig. 8.
Fig. 10 is a top plan view on a reduced scale of the device shown in Fig. 7 with the tool clamp removed.

Each tool carrier includes a profile slide or base block 250. This block has a pair of parallelly extending rails 250' adapted to slidably engage in the portions 208' of the locking grooves 208 as shown in Figs. 7 and 8. Locking bolts 251 (Fig. 9) having heads engageable in the transverse portions 208² of the grooves 208 extend upwardly through suitable bores 251ª in the base block and are equipped with clamping nuts 252 serving to clamp the base blocks to the carriage surfaces (205 or 207) in any adjusted position.

The block 250 is provided adjacent its upper surface with a cam or profile bar groove 253 shaped substantially as shown in Figs. 7 and 8. This groove slidably receives a cam or profile bar 254 having a transverse section complemental to the transverse section of the groove. The block is freely slidable in the longitudinal direction of the cam or profile bar during carriage travel. The cam or profile bar itself is suitably fixed against longitudinal movement by attachment at 254² through suitable linkage (Fig. 2) to the lathe bed 12 and may be replaced as desired. The upper surface of the block 250 also is provided with a rail 255 having the dovetail section shown in Fig. 9 or other suitable section. This rail extends across the width of the block 250 perpendicularly to the cam or profile bar groove 253 and to the longitudinally extending lathe bed. The rail has a cutout portions or recess 255' in the region of the cam bar groove 253 for a purpose to be presently described.

A tool adjustment slide block 257 provided with a groove 258 having a cross-section shaped to slidably receive the rail 255 is provided. This slide block has a transverse bore 259 open at its end 259' and having a reduced opening 260 at its other end. A tubular bracket arm or sleeve 261 is integrally formed with or attached to the slide block 257 with its bored-out portion 262 in axial alignment with the bore 259. The bored-out portion 262 is reduced in section at 262' in the end wall 261'. An upwardly extending flange 263 is provided on the arm 261. This flange has a horizontal bore 264 for a purpose to be presently described.

The end 259' of the bore 259 is closed by an end plate 265 suitably attached to the slide block 257 and having a bore 265' in axial alignment with bores 259, 262 and 262'.

A tool adjustment bolt 270 extending through the said bores is rotatably borne in the bores 262' and 265', and held against longitudinal movement by the nuts 271. The bolt has the threaded portion 270' located in the bore 259. An adjustment nut 272 in the bore 259 engages this threaded portion. This nut has flanges 273 slidably engaging in longitudinal grooves 274 located in the wall of the bore 259 to prevent rotation of the said nut 272. A suitable manipulating knob 275 is carried on the bolt 270 for rotating the latter.

The nut 272 has a lateral flange 276 adapted to extend into the cutout portion 255' in the transverse rail 255. A cam follower 277 is rotatably borne upon a pin member 278 which is threaded into a bore 276' in the flange 276. This cam follower extends into the cam or profile groove 254' in the cam or profile bar 254. Thus movement of the profile slide block 250 with the carriage 17 along the lathe bed will cause the tool adjustment slide block 257 through the cam follower 277 operating in the cam groove 254' to follow the pattern set by the cam or profile groove for cutting of the work blank in a manner to be described more in detail hereinafter. Also as a result of engagement of the cam follower in the cam groove 254', rotation of the manipulating knob 275 will cause relative cross-feed movement of the slide block 257 with respect to the nut 272.

A rail 280 having dovetailed or other suitable section is provided on the upper surface of the slide block 257 and it extends in the same direction as the rail 255. A cross feed pressure actuated slide block 281 is slidably borne on the rail 280, being provided with a groove 281' having dovetailed or other suitable section to slidably receive the rail 280.

The slide block 281 has a pressure cylinder chamber 282 extending parallel to the bore 259 in the slide block and to the rail 280. This chamber extends entirely through the block and is provided at its opposite ends with the threaded portions 283 and 284. A removable threaded plug 285 is threaded into the threaded portion 283 and serves to effectively seal this end of the chamber. A removable plug nut 286 is threaded into the threaded portion 284 and serves to seal the other end of the chamber. This plug nut has an axially extending piston rod bore 286'.

A piston 288 operates in the chamber 282. This piston has a piston rod 289 which extends outwardly from the piston and through the bore 286' in the nut 286, a suitable packing gland arrangement being provided at 290 to seal the chamber during relative movement of the tool block and piston rod. The piston rod at its outer end has a portion 289' of reduced diameter defining a shoulder 289². This portion extends through the bore 264 in the flange 263 and is threaded at 289³ to receive the attaching and clamping nuts, 291, 292. These nuts serve to fixedly attach the piston rod to the flange 263 so that fluid pressure in the chamber 282 at one end or the other of the piston 288 serves to give cross feed movement to the slide block 281 on the guide rail 280 relative to the fixedly-supported piston rod. A fluid inlet passageway 294 in the piston rod 289 and piston 288 and passageway 295 in the block 281 leading to the opposite ends of the cylinder chamber on opposite sides of the piston are provided. These passageways are connected by piping 294ᵃ and 295ᵃ to a controlled pressure source in a manner to be presently described.

The upper surface of the slide block 281 has a tool supporting groove 298 to receive a cutting tool 299. The block is also provided with a plurality of threaded bores 300 carrying the vertically extending clamping bolts 301. A tool clamp member 302 having a downwardly extending flange 303 to press the tool into the groove 298 and holes 304 to receive the clamping bolts 301 is provided.

Clamping nuts 305 serve to press the flange 303 of the member 302 tightly against the cutting tool 299 and lock it to the tool block 280 in the groove 298.

In the embodiment shown, four tool carriers having the structure just described are mounted on the front tool carriage and two tool carriers of like construction are mounted on the rear tool carriage.

The tool carriers just described operate as follows:

After each profile slide or base block 250 has been clamped to the tool carriage surface in the desired adjusted position by means of the clamping nuts 252, and a desired cutting tool 299 clamped to the tool block 281, the tool adjustment slide block 257 is adjusted for depth of tool cut. This adjustment is effected by rotation of the manipulating knob 275 of the bolt 270. Such rotation causes the said bolt to rotate in the nut 272, which latter is fixed against rotation through engagement of its flanges 273 in the grooves 274 and through engagement of the cam follower 277 in the profile cam groove 254'. As a result of the rotation of the said bolt therefore, the latter screws through the nut 272 causing relative cross feed motion of the slide block 257 with respect to the block 250 in a direction toward or away from the turning axis of the lathe, i. e., transversely to the lathe bed.

Introduction now of fluid under pressure to the pressure cylinder 282 through the passageway 295 will cause the tool block 257 to cross feed forwardly toward the work blank for cutting operation, the forward stroke of the slide block 257 being limited by engagement of the end 288' of the piston 288 and the plug 286. So long as fluid pressure is maintained through the passageway 294, the tool block will be maintained in this described cutting position.

Feed movement now of the tool carriage 17 along its guide rail 200 will cause the profile slide block 250 to move with it and slide over the profile cam bar 254 in whose profile cam groove 254' the cam follower 277 now will travel. As a result, the cam groove will give cross feed movement to the slide block 257 and slide block 281 as a unit so that the tool 299 supported on the tool block and bearing under pressure from the pressure cylinder 282 against the work blank W, will cut and profile the work blank W to correspond to the profile of the cam groove 254' over the path of travel of the particular cam follower 277.

When the tool carriage 17 has reached the limit of the cutting stroke, fluid pressure through the passageway 294 is removed and introduced through the passageway 295 to the opposite side of the piston. This causes a reverse motion of the tool block withdrawing the tool from the work.

It is immaterial as to whether manipulating knob 275 is adjusted before or after pressure is introduced into cylinder 282 in the feeding direction. Once this knob is adjusted for a given depth of cut it need not be adjusted again unless a different depth of cut is desired or a new cutter is inserted.

The travel stroke of the forward carriage 17 is so arranged that with the plurality of tool carriers mounted thereon, each carrier will over-travel somewhat the cutting zone of the carrier directly adjacent. As a result of this over-travel and consequent overlapping of cutting zones of adjacent tools, the profiled cut surface of the blank will be entirely free of ridges or blemishes of other kinds resulting from the fact that the tool carriage begins to move along the bed simultaneously with the application of pressure cross fed to the tool carriers, and has been longitudinally displaced a short distance before full tool cutting depth is achieved.

The tool carriers 19' on the rearward tool carriage 18, which is held stationary in the embodiment shown during cutting of a shell blank are supported in a fixed spaced relationship relative to each other so that the cutting tools 299' thereof which are cross fed into the work blank in the same pressure-actuated manner as those on the front tool carriers will serve as the work blank is rotated simply to trim the blank to desired length between its ends. The pressure cross feed of these rearward tools 299' being toward the work blank in the opposite direction to the pressure cross feed of the forward cutting tools 299 has a counterbalancing effect which eliminates substantially all tendencies toward off-centering of the work blank W supported in the lathe.

It is to be noted, too, that the angular arrangement of the tool carriage surfaces 204 and 207 and resultant angular arrangement of the tools 299, 299' relative to the horizontal plane of the lathe bed 12 results in cross feeding of the tools inwardly and downwardly toward the work blank with the tool cutting edges engaging the surface of the blank above the horizontal central plane. This arrangement provides better chip clearance. Also this angular arrangement provides a vertical down thrust component which presses the tool carriages 17 and 18 on to their rails 200 or 201 and thus increases accuracy of the tool cutting operations.

The control system

Figure 11:
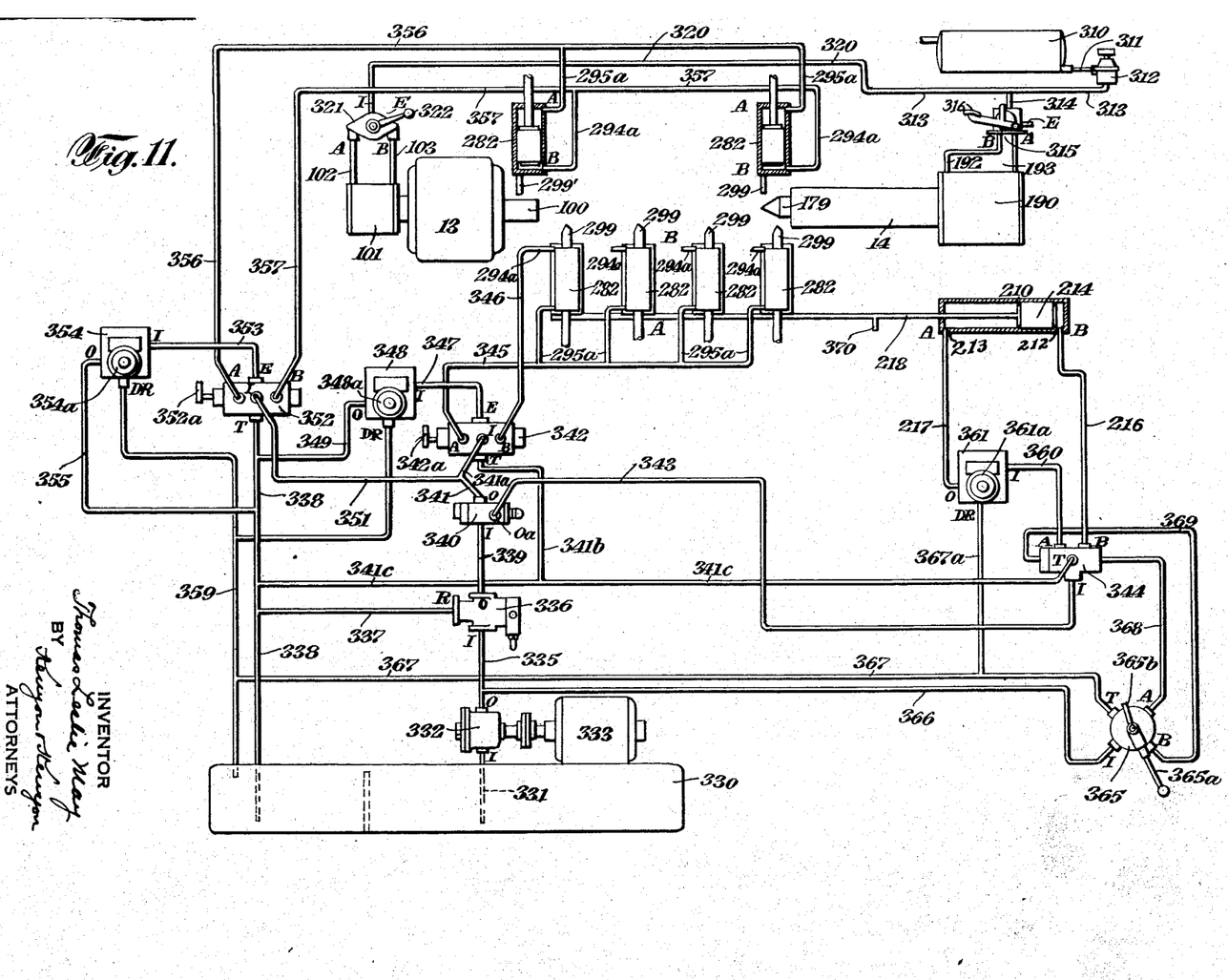
Fig. 11 is a diagrammatic view of the valving connections and fluid (gas or liquid) pressure control system of the lathe.

The control system for supplying fluid (gas or liquid) pressure to the pressure cylinders hereinbefore described is illustrated diagrammatically in Fig. 11.

In the embodiment shown, the pressure cylinders 101 and 190 which serve respectively to operate the chuck 100 and reciprocate the tail stock spindle 179 operate under air pressure supplied from a common pressure tank 310.

Air from this tank is led by pipe or conduit 311 to a suitable pressure adjustment valve 312 and from there to a distributing conduit or pipe 313. A branch conductor pipe 314 connects this distributing pipe 313 to the inlet of a foot-operated air control valve 315 of standard type which is connected at its pressure outlets A and B to pipes 192 and 193 leading respectively to the cylinder 190 on opposite sides of the piston 190ᵃ (Fig. 4). This valve which is operated by the foot treadle 316 is of a "four way" standard reversing type, i. e., when the foot treadle 316 is pressed down once air flows from the valve outlet A through pipe 193 into the cylinder and moves the piston 190ᵃ (Fig. 4) to the left. When the foot is removed, the treadle automatically returns to upper position, leaving the pressure on through pipe 193. Second downward pressure on the treadle reverses flow of air, causing it to flow from the valve outlet B, through pipe 192 into the cylinder 190 on the opposite side of piston 190ᵃ and moves the latter to the right (Fig. 4) and at the same time an exhaust E opens in the valve to bleed the cylinder on the opposite side of the piston through pipe 193 and exhaust E. In this way, successive downward movements of the treadle 316 serve to cause air from the source or tank 310 to move the piston 190 in opposite directions.

This treadle operated spindle control valve 315 is conveniently located at the front of the machine as shown in Fig. 1, so that the operator can press the treadle conveniently at will. The required pipings therefrom are connected in any convenient manner. Any other suitable type of control valve may be used in place of the treadle-operated valve 315.

The rotating chuck operating pressure cylinder 101 is also operated by air from the pressure tank 310. To this end, a pipe or conduit 320 is connected to the distributing pipe or conduit 313 and to the inlet of a standard "four way" reversing type air control valve 321. The two pressure outlets A and B of this valve are connected respectively with the pipes 102 and 103 which lead to opposite sides of the piston 101ᵃ (Fig. 3). This "four way" valve has a manipulating handle 322 which serves to open the pressure through A or B to conduits or pipes 102 or 103, depending upon direction of rotation of the handle and to open the other of the pipes 102 or 103 to exhaust E of the valve, so that pressure from the pipe 313 can be supplied to either side of the piston 101ᵃ to move it in either direction as required to open or close the chuck through corresponding movement of the draw rod 104. Bleeding of the non-pressure side of the cylinder is through the exhaust E.

Valve 321 is suitably supported on the control panel 97 as shown in Fig. 1 and the required pipings therefrom connected to the cylinder and pressure source in any convenient manner.

In the embodiment shown, the pressure cylinders 210 for carriage feed and the pressure cylinders 282 for cross feed of the front and rear tools are supplied from a common pressure source. To this end, an oil or other fluid reservoir or tank 330 is provided. This tank is connected by a pump intake conduit 331 to a suitable pump 332. The pump is driven by a suitable pump motor 333 and the latter is electrically connected through the switch 334 (Fig. 1) on the control panel 97 to a power source (not shown).

The pump outlet O is connected to a delivery conduit 335 which leads to the pressure inlet I of an adjustable pressure relief valve 336 of any standard type. The return outlet R of this relief valve is connected by conduit 337 to the return conduit 338 which flows back to the return side of the reservoir 330. The pressure outlet O of the relief valve is connected by the conduit 339 to the pressure inlet I of an adjustable pressure sequence valve 340 of a standard form. This sequence valve is of a type having a primary pressure outlet O and a secondary pressure outlet Oa. Operation of this valve which is automatic is such that flow at "pressure inlet" is directed to primary pressure outlet O until a pressure equal to the valve setting is built up. Full pressure is then available at both outlets O and Oa and the valve acts as a T on the conduit or piping so long as pressure is maintained above the valve setting.

The primary outlet O of this pressure sequence valve 340 is connected by conduits or pipes 341 and 341a to the inlet I of a "5 way" manually-operated valve 342. The secondary outlet Oa of the pressure sequence valve 340 is connected by a conduit or pipe 343 to the inlet I of a pilot controlled "4 way" reversing valve 344.

The manually-operated "5 way" reversing valve 342 is suitably located on the panel 97ᵃ (Fig. 1) and manipulated by the control handle 342ᵃ. This valve 342 is of a standard reversing type and has two cylinder outlets A and B, either one of which may be opened to pressure from the inlet side of the valve by operation of the control handle 342ª. When pressure from conduit 341ª is open to outlet A, outlet B is open to exhaust outlet T, and, when pressure is open to B, outlet A is open to exhaust outlet E.

Pressure outlet A of the valve is connected by pipe or conduit 345 to inlet conduits 295ª of the front tool cross feed cylinders 282. Pressure outlet B of the valve is connected by pipe or conduit 346 to the inlet conduits 294ª of the front tool cross feed cylinders 282.

Exhaust outlet E of the front cross feed valve 342 is connected by the conduit 347 to the inlet I of an adjustable flow control valve 348 of a standard type. This valve is of the type which controls the rate of fluid flow from the exhaust E. For any given setting of the metering adjustment 348ª of this valve, the rate of controlled flow is maintained independent of any variation of impressed pressure. The outlet O of the valve 348 is connected by a pipe or conduit 349 to the return flow pipe or conduit 338 leading back to the return side of the tank or reservoir 330. The exhaust outlet T of the "5 way" front cross feed valve 342 is connected by conduits 341ᵇ, 341ᶜ to the return flow pipe 338.

A branch pressure conduit or pipe 351 is connected to the pressure pipe or conduit 341 and to the pressure inlet I of a second "5 way" valve 352. This valve 352 is of the same type as valve 342. Either of its two-cylinder pressure outlets A and B may be connected, by operation of the manipulating handle 352ª, to the pressure from conduit or pipe 351. When outlet A is open to pressure, outlet B is open to exhaust T. When outlet B is open to pressure, outlet A is open to exhaust outlet E. Exhaust outlet E is connected by the pipe or conduit 353 to the inlet I of a flow control valve 354 of the same kind and type as flow control valve 348. The outlet O of valve 354 is connected by pipe or conduit 355 to the return flow pipe or conduit 338. Exhaust outlet T is also connected to pipe or conduit 338.

Pressure outlet A of the "5 way" rear cross feed valve 352 is connected by pipe or conduit 356 to the inlet conduits 295ª of the rear tool cross feed cylinders 282. Pressure outlet B of the valve 352 is connected by pipe or conduit 357 to the inlet pipes or conduits 294ª of the rear tool cross feed cylinder 282.

Each of the two flow control valves 348, 354 has an overflow drain outlet DR connected by a suitable pipe or conduit to a return drain flow conduit 359 leading to the return side of the tank or reservoir 330.

The two "5 way" valves 342, 352 are suitably carried on a panel board 97ª fixed suitably to the frame 10 at the front of the machine (Figs. 1 and 5). The manipulating handles 342ª and 352ª thereof are conveniently located at the front of the panel board. Likewise, the flow control valves 348 and 354 are carried on the panel board 97ª and their adjustment knobs 348ª and 354ª so located as to be conveniently manipulated by the machine operator.

The valve and piping arrangements just described serve to operate the tool cross feed of both the front and rear tools. Front cross feed is controlled solely and independently by operation of the handle 342ª of the "5 way" front cross feed valve 342. Turning this valve to open outlet B thereof to pressure from pipes 341, 341ª causes slow cross feed of the tools 299 into cutting relationship with the work blank. The A sides of the cylinders through pipes 345 are then open to exhaust E and these cylinders bleed in controlled manner through the flow control valve 348 to tank 330. Turning the valve 342 to open outlet A to pressure closes B to pressure and opens outlet B to outlet T so that the B side of the cylinder then bleeds directly and freely through outlet T to tank. In this manner, slow cutting feed of the tools into the blank is effected and quick return of the tools is achieved.

Rear cross feed in likewise controlled solely and independently by operation of the manipulating handle 352ª of "5 way" rear cross feed valve 352 and the same slow cutting cross feed of the rear tools and quick return of the said tools is achieved through the agency of said valve 352 and flow control valve 354. Thus when outlet B of valve 352 is open to pressure from the pipe or conduit 351, the A sides of the rear tool slide cylinders 282 are open through conduit 356 to exhaust E and these cylinders bleed through the flow control valve 354 to reservoir or tank 330. Turning the valve 352 to open outlet A to pressure, closes outlet B to pressure and opens outlet B to outlet T so that the B side of the cylinder bleeds directly and freely through outlet T of valve 352 to tank 330.

The pilot-controlled valve 344 for the carriage feed and return is of a standard "4 way" pilot-operated type and has the two pressure outlets A and B, either of which may be opened to pressure by a pilot valve, from the conduit or pipe 343 connected to its inlet I. When outlet A is opened to pressure, outlet B is open to outlet T which is connected to return flow pipe or conduit 338 by conduit 341ᶜ and vice versa when pressure outlet B is open to pressure.

Pressure outlet A is connected by a conduit 360 to the inlet I of an adjustable flow control valve 361. This flow control valve is of the type which permits free flow when outlet A is open to pressure and adjustably controlled flow in the reverse direction for bleeding the A side of the carriage feeding cylinder 210. The outlet O of this flow control valve is connected to the A side of the carriage feeding cylinder by the conduit or pipe 213. Pressure outlet B is connected directly to the B side of cylinder 210 by the pipe or conduit 212. A drain outlet DR is connected by a conduit 361ª to the drain return conduit 367.

The pilot-controlled valve 344 is operated such that when its pressure outlet B is open, pressure is applied to the piston 214 on the B side of the cylinder, imparting feeding stroke to the front carriage 17. At the same time, the A side of the cylinder bleeds at a controlled rate through the flow control valve 361 having an adjustment 361ª. When pressure outlet A is open to pressure, outlet B is open to outlet T for free return flow. Pressure from A also flows freely through the valve 361 into the A side of the cylinder, causing quick carriage return.

Operation of the pilot-controlled 4 way carriage feed valve 344 is effected by a pilot valve 365. This pilot valve is a standard "4 way" reversing type having a pressure inlet I connected to the pressure conduit 335 by a pipe or conduit 366. It also has an exhaust or return outlet T connected by a pipe or conduit 367 to the drain return 359. The valve has two pressure outlets A and B, either of which may be opened to the pressure from inlet I. When outlet A of this valve is open to pressure, outlet B is open to tank T and vice versa. Outlets A and B are connected by pipes or conduits 368 and 369 to the pilot-controlled valve 344 and pressure in one pipe or the other causes required opening or closing of the pressure outlets A and B of the valve 344. The pilot valve is conveniently operated by an operating handle 365ᵃ. This handle carries a dog or nose 365ᵇ located in the path of travel of a cam 370 suitably attached to the carriage 17 (Fig. 5). This cam is of a one-way type which strikes the dog or nose 365ᵇ when the carriage reaches the end of its feeding stroke and reverses the pilot valve to cause carriage return. In return stroke, the cam is inoperative to effect any tripping of the pilot valve 365. In this way, the carriage feed return is effected automatically at the end of the feed stroke. The feed stroke is controlled by operation of the handle 365ᵃ by the operator.

The flow control valve 361, the four-way pilot-operated valve 344 and the pilot valve may be conveniently located on the panel 97ᵃ (Fig. 1) with the various pipings or conduits conveniently led therefrom to the other parts of the machine.

The machine is also equipped with a suitable chip receiving tray 375 suitably supported from the frame 10 below the bed 12.

The machine, too, may be equipped with a pump system for supplying cutting fluid to the surface of the work blank. This system is illustrated diagrammatically in Fig. 1 by the motor pump system 380. The motor of this system is controlled by a switch 381 located on the control panel 97.

The driving motor 94 of the machine is equipped with a magnetic brake 385 or other suitable type of brake of any well-known form. This brake is of a type having its electric operating media 386 responsive to a start and stop handle 387 of a switch (not shown) conveniently located on the control panel 97. The circuit connections for the brake being conventional and well known are not shown.

Operation of the machine

Operation of the machine can best be described with reference to a hollow work blank such as that illustrated in Fig. 6 which is to be shaped to conform to that shown in Fig. 6ᵃ.

The two rear tool carriers 19' are positioned on the rear carriage 18 so that their cutting tools 299' will sever the blank W into the predetermined length of the finished blank W' of Fig. 6ᵃ.

A profile bar 254 having a profile groove 254' corresponding to the profile of the blank W' of Fig. 6ᵃ is mounted on the carriage bed in the cam grooves 253 of the profile slide blocks 250 as previously described. Then the four front tool carriers are positioned on the front tool carriage 17 in such manner that the feed stroke of the carriage 17 will cause tools 299 on adjacent carriers 19 to overlap slightly the start of the cut of the tool of the next succeeding carrier in the direction of feed near the end of the carriage stroke.

Each tool on its carrier 19 or 19' is then adjusted for required depth of cut by the manipulating knobs 275.

A spacing mandrel 390 having a blunt forward nose 390ᵃ (Fig. 6) is then inserted in the hollow work blank W and the open end of the latter slid over the expansible mandrel which is in its retracted position. The treadle 316 is then pressed by the operator, causing the tail stock spindle 179 under pressure to move toward the chuck under pressure until the centering end 179' engages the centering bore 391 of the work blank and has pushed the blank onto the chuck 100 to the limit permitted by the spacing mandrel 390 and maintains it in this position as long as pressure is maintained in the pressure cylinder 190 through the pipe or conduit 193.

The operator then operates the lever 322 of the chuck valve 321 controlling the pressure cylinder 101 which expands the mandrel 100 and thus couples the work blank W to the drive spindle 55 in the lathe head.

The operator then starts the drive motor 94 by pressing switch 96 on panel 97, the oil pump motor 333 by pressing switch 334 on the same panel 97, and the cutting fluid motor by pressing switch 381 on the panel. Then the drive motor gear shift lever 83 is rotated to provide required gearing ratio for rotating the head drive spindle 55 in the manner previously described. Thereafter, the operator in succession operates the levers 342ᵃ, 352ᵃ and 365ᵃ to apply pressure from the oil pressure system to the cylinders 282 and 210 in the manner described to cause cross cutting feed pressure of the tools 299 and 299' and feed of the carriage 17 toward the head. The pressure on the tools remains constant and they are fed into the work blank to their adjusted depth by the continuous feeding pressure in the respective tool feed cylinders 282. Likewise the feeding pressure in the carriage cylinder 210 moves the carriage along the lathe bed causing the profile slide 276 of each front tool carrier 19 to move along the profile cam bar 254. During this movement, the cam followers 277 move in the profile cam 254' and cause the front tools 299 to cut a profile on the work blank in conformity with that outlined by the profile cam 254' in the path of travel of the cam followers. When the carriage reaches the end of its stroke, the cam 370 thereon trips and reverses the pilot valve dog 365ᵇ causing quick automatic return of the carriage to its starting position. In this single carriage feed, the tools cut the blank to the shape shown in Fig. 6ᵃ.

Upon completion of the return stroke of the carriage, the operator switches off the drive motor 94 and operates the magnetic brake 385 to stop the motor through the switch lever 387.

The tools are then moved in quick return stroke to retracted position by manipulation of levers 342ᵃ and 352ᵃ of the "5 way" valves 342 and 352 in the manner described. Then the treadle 316 is depressed to retract the tail stock spindle 179 by reversal of direction of pressure in the air cylinder 190.

The finished blank is then released from the chuck by operation of the lever 321 of the valve 320 controlling the air cylinder 101 and the finished blank removed.

This cycle of operations is repeated for each blank W treated in the machine.

It is to be understood, of course, that the machine is adaptable for tooling operations on other types of work blanks and that modifications within the scope of the claims is contemplated.

I claim:

1. In a lathe having means for supporting and rotating a work blank, a profile member, a tool carriage movable in the axial direction of said work blank, tool carriers on said carriage movable transversely of the axial direction of said work blank, each of said carriers comprising a profile slide block adjustably positioned on said carriage, said slide block being movable with said carriage and having a recessed portion in which said profile member is slidably received, a tool adjustment slide block slidably borne on said profile slide block, an adjustable member within said tool adjustment slide block having a part extending therefrom into engagement with said profile member to effect movement of said tool adjustment slide block in conformity with that required by said profile member, a pressure slide block slidably borne on said tool adjustment slide block, means for adjustably positioning said adjustable member relative to said tool adjustment slide block whereby the latter may have its position relative to said profile slide block changed, pressure actuated means in said pressure slide block for reciprocally moving said last-named slide block relative to said tool adjustment slide block, means for clamping a cutting tool to said pressure slide block, and means for supplying fluid pressure to said pressure actuated means.

2. In a lathe having means for supporting and rotating a work blank, a tool carriage movable in the axial direction of said work blank in its supported position, a plurality of spaced tool carriers on said carriage movable as a unit therewith and each movable transversely of the direction of travel of said carriage, each of said carriers comprising a profile slide block slidably supported on said carriage, a tool adjustment slide block slidably borne on said profile slide block, a pressure slide block slidably borne on said tool adjustment slide block, means for adjustably positioning said tool adjustment slide block relative to said profile slide block, means for guiding said tool adjustment slide block to outline a predetermined profile therewith during movement of said profile slide block with said tool carriage, pressure actuated means for moving said pressure slide block relative to said tool adjustment slide block and means for attaching a cutting tool to said pressure slide block, and means for supplying fluid pressure to said pressure actuated means.

3. In a lathe having means for supporting and rotating a work blank, a tool carriage movable in the axial direction of said work blank in its supported position, a tool carrier on said carriage movable therewith and transversely of the direction of travel of said carriage, said carrier comprising a profile slide block slidably supported on said carriage, a tool adjustment slide block slidably borne on said profile slide block, a pressure slide block slidably borne on said tool adjustment slide block, means for adjustably positioning said tool adjustment slide block relative to said profile slide block, means for guiding said tool adjustment slide block to outline a predetermined profile during movement of said profile slide block with said tool carriage, pressure-actuated means for moving said pressure slide block relative to said tool adjustment slide block, means for attaching a cutting tool to said pressure slide block, and means for supplying fluid pressure to said pressure actuated means.

4. In a lathe having means for supporting and rotating a work blank, a tool carriage movable in the axial direction of said work blank in its supported position, a tool carrier on said carriage movable therewith and movable transversely of the direction of travel of said carriage, said carrier comprising a profile slide block slidably supported on said carriage, a tool adjustment slide block slidably borne on said profile slide block, a pressure slide block slidably borne on said tool adjustment slide block, a threaded member fixed against rotation slidably borne in said tool adjustment slide block, a second threaded member fixed against longitudinal displacement in said last-named slide block and threadedly engaging said first-named threaded member for adjustably positioning said tool adjustment slide block relative to said profile slide block, a profile bar on which said profile slide block is movable having a profile groove, means associated with said first-named member and engaging in said groove for guiding said tool adjustment slide block to outline the profile of said groove during movement of said profile slide block with said carriage, means for attaching a cutting tool to said pressure slide block, and pressure-actuated means for moving said pressure slide block relative to said tool adjustment slide block.

5. In a lathe having means for supporting and rotating a work blank, a tool carriage movable in the axial direction of said work blank in its supported position, a tool carrier on said carriage movable therewith and movable transversely of the direction of travel of said carriage, said carrier comprising a profile slide block slidably supported on said carriage, a tool adjustment slide block slidably borne on said profile slide block, a pressure slide block slidably borne on said tool adjustment slide block, a threaded member fixed against rotation slidably borne in said tool adjustment slide block, a second threaded member fixed against longitudinal displacement in said tool adjustment slide block and threadedly engaging said first-named threaded member for adjustably positioning said tool adjustment slide block relative to said profile slide block, a profile bar on which said profile slide block is movable having a profile groove, means associated with said first-named threaded member and engaging in said groove for guiding said tool adjustment slide block to outline the profile of said groove during movement of said profile slide block with said carriage, pressure-actuated means for moving said pressure slide block relative to said tool adjustment slide block, and means for supplying fluid pressure to said pressure-actuated means.

6. In a lathe having means for supporting and rotating a work blank, a profile member having a profile groove, a tool carriage movable in the axial direction of said work blank in its supported position, a plurality of spaced tool carriers on said carriage movable as a unit therewith and each movable transversely of the direction of travel of said carriage, each said carrier comprising a profile slide block slidably supported on said carriage and having a recessed portion in which said profile member is slidably received, means for clamping said profile slide block to said carriage, a tool adjustment slide block slidably borne on said profile slide block, a pressure slide block slidably borne on said tool adjustment slide block, means for attaching a cutting tool to said pressure slide block, an internally threaded member fixed against rotation slidably borne within said tool adjustment slide block, a rotatable threaded member fixed against longitudinal displacement supported in said tool adjustment slide block and threadedly engaging said internally threaded member for adjustably positioning said tool adjustment slide block relative to said profile slide block, a follower member depending from said internally threaded member and extending into said profile groove for guiding said tool adjustment slide block to outline the profile of said groove during movement of said profile slide block with said carriage, a pressure actuating means within said pressure slide block for moving the latter relative to said tool adjustment slide block, and means for supplying fluid pressure to said pressure-actuated means.

7. In a lathe having means for supporting and rotating a work blank, a profile member having a profile groove, a tool carriage movable in the axial direction of said work blank in its supported position, at least one tool carrier on said carrier movable therewith and movable transversely of the direction of travel of said carriage, said carrier comprising a profile slide block slidably supported on said carriage and having a recessed portion in which said profile member is slidably received, means for clamping said profile slide block to said carriage, a tool adjustment slide block slidably borne on said profile slide block, a pressure slide block slidably borne on said tool adjustment slide block, means for attaching a cutting tool to said pressure slide block, an internally threaded member fixed against rotation slidably borne within said tool adjustment slide block, a rotatable threaded member fixed against longitudinal displacement supported in said tool adjustment slide block and threadedly engaging said internally threaded member for adjustably positioning said tool adjustment slide block relative to said profile slide block, a follower member depending from said internally threaded member and extending into said profile groove for guiding said tool adjustment slide block to otuline the profile of said groove during movement of said profile slide block with said carriage, a pressure-actuating means within said pressure slide block for moving the latter relative to said tool adjustment slide block, and means for supplying fluid pressure to said pressure-actuated means.

THOMAS LESLIE MAY.